G. Borden.
Vacuum Pan.
No. 2226. Reissued Apr. 17. 1866.
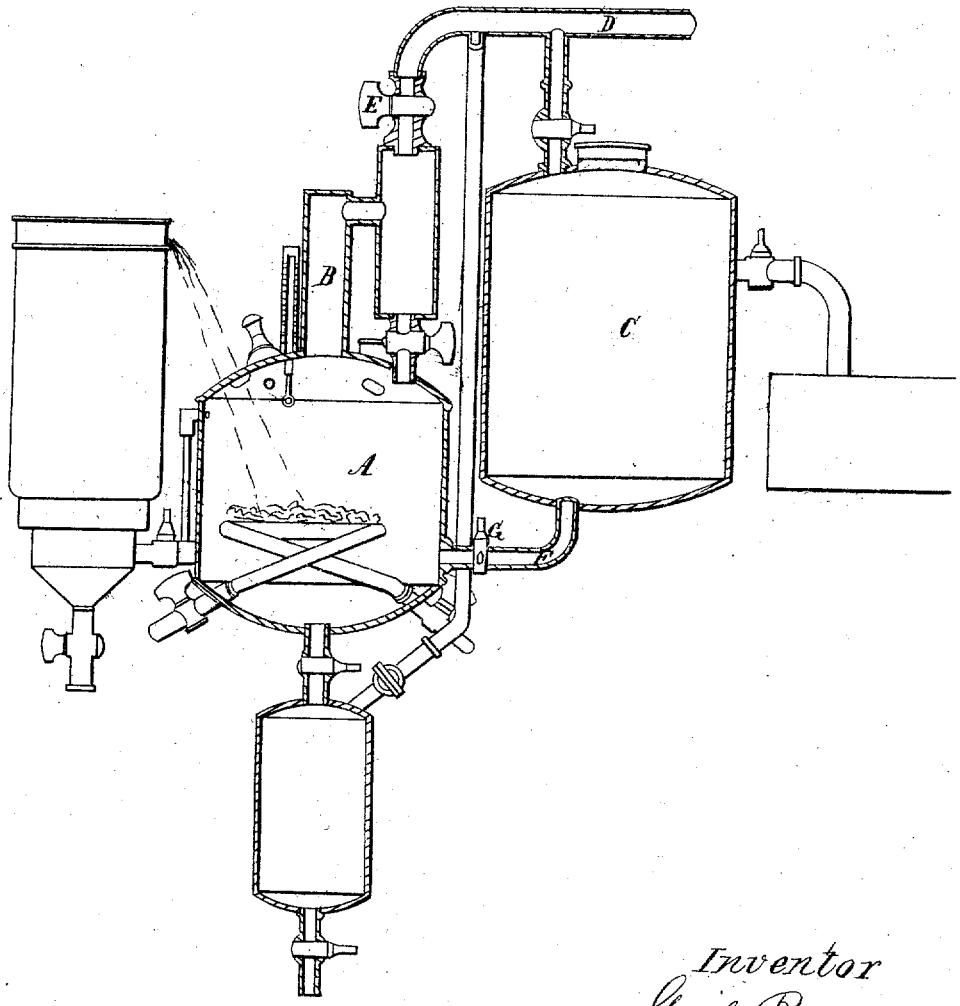
Witnesses
E. W. W. Griffin
Wm. H. McCabe
Inventor
Gail Borden
By S. D. Cozzens
His attorney

UNITED STATES PATENT OFFICE.

GAIL BORDEN, OF SOUTH EAST, NEW YORK.

IMPROVEMENT IN CONDENSING MILK.

Specification forming part of Letters Patent No. 15,553, dated August 19, 1856; Reissue No. 1,306, dated May 13, 1862; Reissue No. 1,398, dated February 10, 1863; Reissue No. 2,103, dated November 14, 1865; Reissue No. 2,226, dated April 17, 1866.

*To all whom it may concern:*

Be it known that I, GAIL BORDEN, of South East, in the county of Putnam and State of New York, have invented a new and useful Process or Method of Operation for Concentrating and Preserving Milk; and I do hereby declare that the following is a full, clear, and exact description of the same.

The nature of my invention will be best understood by attending to the following considerations concerning the subject to which it relates. Milk, like blood, is what may be termed a "living fluid"—that is to say, the sources from which it is derived, whether animal or vegetable, are always found possessed of vitality, and in this life it seems to participate so long as it remains connected with the bodies which produce or contain it, while as soon as it is separated from them it begins to undergo change and die. All organic substances are injuriously affected by the atmosphere, and are liable to reaction among their constituent elements; hence the deterioration of milk is greatly influenced and accelerated, though not wholly caused, by exposure to air. It is doubtless for these reasons that nature provides means for transferring the milk of animals to their young by causing it to pass through a vacuum. This demonstrates that the less milk is suffered to be acted upon by the external air the better is its condition, and this fact has suggested the first portion of my improved process, and has led me to perform the concentration, which is one object of my invention, in such a manner as to exclude the milk as much as possible from contact with the atmosphere while it is being concentrated; and for this purpose I cause the concentrating process to be performed in a vacuum-pan in the mode hereinafter described.

Crude milk—that is, milk in its natural state as it comes from the animal furnishing it—contains among its constituent elements caseine and albumen, the albumen being combined with the caseine. When milk is brought into contact with a surface which is at a temperature of, say, 145° to 150° Fahrenheit, or thereabout, this caseine, and probably the albumen also, will commence to burn, and when so burning will "bake" or "stick" onto any such surface and form a coating, which will constantly increase in thickness if the burning continues, and which is almost absolutely impenetrable to heat. In order, however, to render the operation of concentrating milk in a vacuum-pan sufficiently rapid and economical to be of practical value, it is necessary that the metal of the pan and of the coil (if a coil be used) should have a higher heat than the 145° to 150° above mentioned; but if such higher heat is employed the caseine of the milk at once begins to burn, and it will then so bake and coat onto the inner surface of the pan and the outer surface of the coil that, for the reason already stated, the conduction of the heat to the milk soon stops or nearly stops, and the concentration can no longer be carried on to any practical or desirable extent. Moreover, it is extremely important to retain the caseine and the albumen combined with it on account of the highly nutritive properties of each of these substances, and their baking to the hot metal deprives the milk of the greater portion of them and seriously injures the quality of the charge in the pan, besides imparting to it a very disagreeable burned taste. On the other hand, if a degree of heat in the metal is employed lower than that at which the burning of the caseine will take place, the operation of concentration will be made so slow and tedious as to be useless for practical purposes. These are the difficulties which render valueless all the processes for concentrating milk which were, so far as I am aware, proposed before my invention, and they are the difficulties which I was compelled to encounter in perfecting my improved process.

From what has been said respecting them, it is manifest that it is indispensable to provide proper means for preventing the baking or coating of which I have spoken, and to this relates the second portion of my invention. To accomplish it I, after long-continued experiments, ascertained that if the milk to be concentrated be heated before it is run into the vacuum-pan, the coating will be entirely obviated. This result I have until recently ascribed to what I supposed was the fact—namely, that it was the albumen contained in the milk which, by being coagulated by the heat in the vacuum-vessel, was precipitated upon any surface exposed to it, and thus formed the coating, and that by the preliminary heating of the milk the greater portion of its albumen was coagulated away from the pan, so that no further injurious precipitation would be produced by the subsequent heating in the vacuum process; but since my patent was last reissued, on the 14th of November, 1865, I have ascertained that this supposition was probably erroneous, and that it is simply the burning of the caseine, or of the combined caseine and albumen, which causes the coating, and that the manner in which my preliminary heating operates to prevent the "baking" or "sticking" of the milk is by raising the temperature of the latter sufficiently high before it is introduced into the pan to enable it to boil instantaneously or very quickly after such introduction, by reason of the well-known fact that the boiling-point of a liquid *in vacuo* is much lower than in the atmosphere, because in a vacuum the pressure of the atmosphere is removed, and also by reason of the fact that when milk in a vacuum-vessel once comes into a state of ebullition or agitation little or no coating will take place, probably because the caseine, by being constantly in motion, cannot adhere to the hot surfaces and be burned. It is upon these two principles that my improved process is based—that is to say, upon the evaporating of the milk away from the atmosphere and upon the preliminary heating of it out of the vacuum-pan, and to enable those skilled in the art to which my invention relates to put the same in practice, I will proceed to describe it in detail. I would, however, premise that although I have in the annexed drawing represented apparatus for carrying out my process, I have done so only for the purpose of making my description more complete. I do not make claim to the machinery therein shown, as the same is not new; nor do I claim any other machinery, and almost any of several well-known devices for heating liquids and boiling them *in vacuo* will answer the purpose. The thing which I have invented is the process itself, and the working of this is in no way dependent upon any particular form of apparatus.

A is a vacuum boiler or pan for concentrating the milk out of contact with the atmosphere.

B is a pipe connected with said vacuum-boiler, and also with an air-pump and condenser, as commonly employed by sugar-refiners.

C is a vacuum-reservoir, in which new sweet milk may, if preferred, be kept until it is desired to transfer it to the vacuum-boiler for concentration. This reservoir is connected with the boiler and with the air-pump, and a vacuum may be produced in it by the air-pump through a pipe, D, communicating with it. E is a cock to open and close this communication.

F is a pipe connecting the reservoir with the boiler A, and provided with a stop-cock, G. The reservoir is fitted with a man-hole for convenience of cleaning, and it may be charged with milk by atmospheric pressure through a suitable pipe leading from the milk-cans.

The milk is boiled and concentrated in the vessel A by means of steam or other heat applied in any of the well-known methods adopted in connection with the use of an air-pump and condenser. I prefer to use a steam-pipe inside of the boiler, and when one is employed it should be so coiled that every part of it may be reached by the hands, so that it may be readily and thoroughly cleansed. Both a steam-pipe and a jacket may be employed at the same time. A thermometer may be inserted into the boiler, and a vacuum-gage be connected with it to indicate the temperature of the contained fluid and the extent of the vacuum.

The milk to be concentrated *in vacuo* is first to be heated, and I prefer that this heating should take place as soon as practicable after milking. It may be performed in the reservoir C, or in any other suitable vessel, and the heat may be applied in any convenient manner. The temperature which I have employed for this preliminary heating is from 150° to 200° Fahrenheit; but I do not confine myself to any specific temperature so long as the milk is heated sufficiently to enable it to boil instantaneously or very quickly after it is let into the vacuum-pan A, it being the preliminary heating itself for this purpose, and not any particular temperature, which constitutes the gist of this part of my invention.

The working of the vacuum-boiler is conducted in a manner similar to that employed in using vacuum-pans in the manufacture of refined sugar, except that I find it best to first place a small quantity of milk in the pan, and after the boiling has commenced to let more milk run in from the reservoir or other vessel or receptacle by a gradually-flowing stream, regulated in quantity in such a manner as always, or during the principal part of the evaporating process, to maintain the fluid in the boiler A at about the same consistency or state of spissitude.

I do not confine myself to any particular degree of concentration of milk. It may be carried as far as desired, and I have reduced it eighty-three per cent.; but I usually prefer to concentrate it to from about sixty-five to about eighty per cent.

The concentrated milk produced by my process is prepared for consumption by adding water to it in proportion to the degree of concentration to which it has been subjected, and it will then produce about the same quantity of cream as the original milk. It is also rendered preservative and soluble without the use of sugar or any antiseptic, which is a thing that has never, to my knowledge, been effected before.

Besides other advantages of concentrating milk *in vacuo*, there are no means yet discovered by which evaporation is so rapidly and safely conducted.

Milk concentrated by my plan can be afforded for a much less price than that for which other concentrated milk has heretofore been sold. My process will cause milk to come into as general and common use as sugar.

Having thus described my invention, I would state that I am aware that it is and long has been very common to scald milk, both among housewives for the purpose of preserving it, and among others as a portion of certain processes employed in preparing milk for market.

My preliminary heating of the milk, while it in fact serves to secure the retention of its nutritive properties and to increase its preservative qualities, has in view a matter entirely distinct from these things—namely, the prevention of the coating of the vacuum-pan in the manner described. However, I do not claim, broadly, the heating of milk.

I am likewise aware that others, before my invention, have conceived the idea of evaporating milk *in vacuo*, and that several patents have been granted for processes which profess to successfully effect this result, and also for still other modes, which propose to concentrate milk; but of these processes, those which may be said to constitute a first class are merely such as use a vacuum apparatus for boiling the milk, unaccompanied by any provision whatever for first preparing it to be concentrated in the pan by heating it before it is run into the latter. Those which may be said to constitute a second class are such as do not employ a vacuum apparatus at all, but use merely an open pan combined with some arrangement for stirring the contained milk, which obviously has nothing in common with my process; but,

Having thus described my invention, what I do claim as new, and desire to secure by Letters Patent, is—

The within-described process or method of operation for concentrating and preserving milk by means of the preliminary heating thereof, substantially as described, in combination with the evaporation of the fluid *in vacuo*.

GAIL BORDEN.

Witnesses:
S. D. COZZENS,
JAS. BUTLER.